(12) United States Patent
Aguilar Mendez et al.

(10) Patent No.: US 10,487,594 B2
(45) Date of Patent: Nov. 26, 2019

(54) TUBULAR COMPONENT CONNECTION PROTECTOR

(71) Applicant: VALLOUREC OIL AND GAS FRANCE, Aulnoye-Aymeries (FR)

(72) Inventors: Jose Antonio Aguilar Mendez, Veracruz (MX); David Ontiveros Carmona, Veracruz (MX); Arnaud Verleene, Saint-Saulve (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 327 days.

(21) Appl. No.: 15/515,088

(22) PCT Filed: Oct. 20, 2015

(86) PCT No.: PCT/FR2015/052815
§ 371 (c)(1),
(2) Date: Mar. 28, 2017

(87) PCT Pub. No.: WO2016/062961
PCT Pub. Date: Apr. 28, 2016

(65) Prior Publication Data
US 2017/0254156 A1    Sep. 7, 2017

(30) Foreign Application Priority Data
Oct. 24, 2014    (FR) ..................... 14 60235

(51) Int. Cl.
*E21B 17/042* (2006.01)
*F16L 15/04* (2006.01)
(Continued)

(52) U.S. Cl.
CPC ........ *E21B 17/042* (2013.01); *E21B 17/0423* (2013.01); *F16L 15/04* (2013.01);
(Continued)

(58) Field of Classification Search
CPC .. E21B 17/042; E21B 17/0423; F16L 57/005; F16L 15/04; F16L 15/06; F16L 15/08
See application file for complete search history.

(56) References Cited

U.S. PATENT DOCUMENTS

RE30,647 E    6/1981    Blose
4,809,752 A *  3/1989   Strodter ................. B65D 59/06
                                                      138/96 T
(Continued)

FOREIGN PATENT DOCUMENTS

CN    1440497 A    9/2003
CN    102985746 A   3/2013
(Continued)

OTHER PUBLICATIONS

International Search Report dated Jan. 19, 2016 in PCT/FR2015/052815 filed Oct. 20, 2015.
(Continued)

*Primary Examiner* — James M Hewitt, II
(74) *Attorney, Agent, or Firm* — Oblon, McClelland, Maier & Neustadt, L.L.P.

(57) ABSTRACT

A protector for a male end or a female end of a tubular drilling or production component for hydrocarbon wells, the end respectively including at least one external thread or internal thread, an annular external surface and an annular internal surface separated by the at least one thread, the protector including a first internal or external thread including at least one first threaded portion including at least one thread with pitch P1 configured to cooperate with the thread of the end to screw the protector onto the end, and a second threaded portion including at least one thread with a pitch P2 different from P1.

13 Claims, 3 Drawing Sheets

(51) Int. Cl.
*F16L 15/06* (2006.01)
*F16L 15/08* (2006.01)
*F16L 57/00* (2006.01)

(52) U.S. Cl.
CPC .............. *F16L 15/06* (2013.01); *F16L 15/08* (2013.01); *F16L 57/005* (2013.01)

(56) References Cited

U.S. PATENT DOCUMENTS

| | | | |
|---|---|---|---|
| 6,027,145 | A | 2/2000 | Tsuru et al. |
| 6,474,411 | B1 * | 11/2002 | Carrano Castro ..... B65D 59/02 166/241.7 |
| 6,712,401 | B2 | 3/2004 | Coulon et al. |
| 2002/0163192 | A1 | 11/2002 | Coulon et al. |
| 2009/0220780 | A1 | 9/2009 | Bordet et al. |
| 2010/0038904 | A1 * | 2/2010 | Yamamoto ............ F16L 57/005 285/390 |
| 2011/0148103 | A1 * | 6/2011 | Courtois ............... F16L 15/001 285/333 |
| 2011/0265904 | A1 * | 11/2011 | Baker .................... B65D 59/02 138/96 T |
| 2013/0213516 | A1 * | 8/2013 | Clem .................... F16L 57/005 138/96 T |
| 2014/0203556 | A1 | 7/2014 | Besse |

FOREIGN PATENT DOCUMENTS

| | | |
|---|---|---|
| EP | 0 148 807 A1 | 7/1985 |
| EP | 1 211 451 A1 | 6/2002 |
| EP | 2 126 449 | 12/2009 |
| EP | 2 212 510 A1 | 8/2010 |
| FR | 2 818 728 A1 | 6/2002 |
| FR | 2 892 174 A1 | 4/2007 |
| FR | 2 979 968 A1 | 3/2013 |
| JP | 60-69385 | 4/1985 |
| JP | 2001-199469 A | 7/2001 |
| JP | 2003240188 A | 8/2003 |
| RU | 2 027 097 C1 | 1/1995 |
| RU | 2 444 672 C2 | 3/2011 |
| RU | 2 482 371 C1 | 5/2013 |
| WO | WO 2008/116986 A1 | 10/2008 |
| WO | WO 2011/140014 A2 | 11/2011 |

OTHER PUBLICATIONS

English translation of Notice of Reasons for Refusal for JP2017-522392, dated Jul. 16, 2019.

* cited by examiner

TUBULAR COMPONENT CONNECTION PROTECTOR

The invention concerns tubular threaded components and to be more precise end protectors for certain of these components, notably drilling or production tubes for oil or natural gas wells.

Here, "component" means any drilling or production element or accessory used for a well and comprising at least one connection or connector or threaded end and intended to be assembled by a thread to another component to constitute with that other component a tubular threaded joint. For example, the component may be a tubular element of relatively great length, notably around ten meters long, for example a tube, or a tubular sleeve a few tens of centimeters long, or an accessory of these tubular elements (suspension device or hanger, section change part or cross-over, safety valve, drilling rod connector or tool joint, sub, and the like).

The components are generally assembled to one another to be lowered into the hydrocarbon or similar well and constitute a bore lining, a string of casing tubes or liner tubes or a string of production tubes (tubing) (production strings).

The specification API 5CT issued by the American Petroleum Institute (API), equivalent to the standard ISO 11960:2004 issued by the International Standardisation Organisation (ISO), governs the tubes used for casing or tubing and the specification API 5B defines standard threads for these tubes.

API specification 7 defines shouldered threaded connections for rotary drill pipes.

Manufacturers of tubular threaded joint components have also developed joints known as premium threaded joints that have specific thread geometries and specific means for improving their performance in service, notably in terms of mechanical strength and sealing.

The threaded connections most often comprise one or two substantially trapezoidal threads which comprise a stabbing flank on the side of the threads directed toward the free end of the threaded element concerned, a load flank on the side opposite the stabbing flank, a thread crest of non-zero width and a thread root likewise of non-zero width, the load flanks and the stabbing flanks being substantially perpendicular to the axis of the threaded element (for example, according to the API standard, the API Buttress thread has an inclination of +3° for the load flanks and an inclination of +10° for the stabbing flanks).

There also exist triangular or round threads also having stabbing flanks and load flanks with thread crests and roots of substantially zero width but these are very little used nowadays because of their high jump-out risk.

The aforementioned components may include a threaded male end that is intended to be screwed to a threaded female end of another drilling or production component. It is therefore indispensible that their male and female ends suffer as little damage, pollution or deterioration as possible between the time they leave the production line and the time at which they are used, and also between two successive uses. Clearly it is in fact necessary to protect against corrosion, dust and impacts (or blows) not only the thread but also any bearing surface(s) and stop(s), which have specific and complementary functions, notably with a view to providing a seal in use.

Moreover, the ends of the aforementioned components were generally coated with a grease with anti-galling properties just before assembling them.

It is increasingly standard practice to replace this grease with a combination of surface treatments and coatings applied in thin layers to the connections, i.e. to the threads, the bearing surfaces and/or on the stops.

For example, it has been proposed, notably in U.S. Pat. No. 6,027,145, EP 1211451 and FR 2892174, to replace the grease finally applied to the end of the component with a brush with a thin layer of a dry lubricant based on solid lubricating particles, of predetermined thickness and applied in the factory.

These surface treatments and coatings have hardness, lubrication and anticorrosion properties suited to the life situation of the assembly of two connections or to the assembled state and it is necessary to adapt the protectors of the connection outside these life steps of the product, notably during storage, handling and transportation, to protect the connection as much from mechanical removal of material as from pollution (sand, debris) compromising the efficacy of the product.

The coatings are also known as lubricating coatings and described as solid or semi-solid, dry or semi-dry. They have viscosity properties that extend over a very wide range, from 500 mPa·s at 25° C. to more than 5000 mPa·s at 25° C., and some are described as "sticky", i.e. after application to the surfaces of the connection they may adhere to an object that touches them, and notably may be transferred to the fingers of an operative brushing against the coated surface of the connection. Others on the other hand are described as rigid and have a certain hardness. These properties are desirable to facilitate the assembly of two connections, but give rise to problems with the connection protectors. In fact, the latter having to protect the connections from impacts, they must be firmly attached to the connection and must have rigid bodies.

Protectors are devices the function of which is to protect the functional surfaces of male or female connections: These functional surfaces may be one or more threads, one or more bearing surfaces, one or more stops. A protector is of substantially cylindrical general shape and generally comprises a mechanical shock absorber situated at the end opposite the free end of the protector, a body, and attachment means. The solution generally adopted for attaching a protector to a connection is to screw it onto the connection thread. This solution enables a simple mounting gesture associated with precise positioning. The protector therefore includes a thread adapted to be screwed onto the connection thread. The thread is most often of the same type and the same pitch as that of the connection. A protector thread therefore comprises threads with stabbing flanks, on the side of the threads facing toward the free end of the protector and intended to come into contact with stabbing flanks of the threads of a connection when screwing the protector onto the connection, load flanks, thread crests and thread roots.

Also, with the introduction of surface treatments and coatings applied to the connections, protectors have been provided with sealing means to strengthen the watertightness or airtightness of the spaces around the surfaces comprising the functional surfaces of a connection.

However, the applicant has noticed that when transporting or handling tubes on which known protectors are mounted, the functional surfaces of the connections are insufficiently protected against deterioration, notably against mechanical impacts. It happens that known protectors are partially or totally unscrewed or that functional surfaces are damaged despite the presence of the known protector mounted on the connection.

US20100038904 proposes a protector for female connections comprising a thread which has a thread height greater than the thread height of the connection. Also, the basic protector thread comprises a stabbing flank intended to be in contact with the stabbing flank of the basic thread of the female connection and the angle of the stabbing flank of the protector thread is different from the angle of the stabbing flank of the connection thread. These two features make it possible on the one hand, because of the difference in the thread height, to prevent contact between the protector thread root and the connection thread crest, and therefore to limit the deterioration of the coating on the connection thread crests, and on the other hand, because of the angle difference between corresponding flanks, to reduce the area of contact between these stabbing flanks. This makes it possible to protect the coating of a portion of the surface of the stabbing flanks of the connection. However, this solution is not entirely satisfactory because the forces exerted between a stabbing flank of the protector thread and a stabbing flank of the connection thread are found to be concentrated on a portion of the stabbing flank of the connection thread and this results in this area being more subject to possible deterioration of the coating.

There has been proposed in WO2011/140014 a protector the threads of which have a pitch very much greater than the connection threads, so that the connection threads cut the protector threads, the connection threads digging into the material of the protector threads. This enables production economies to be achieved with a standardized protector when faced with connections that may have different types of thread. However, this solution is not suitable for connections with coated threads. In fact, the connection threads cut the material of the protector threads, generating swarff. The walls of recesses formed in the protector thread material and the swarff will tend to scrape the connection thread flanks, crests or roots and to remove the grease or the coating from the surface of said connection threads.

Adopting a different approach, the applicant has proposed in EP2126449 a protector with flexible sealing means that have first and second orientations in the free state and third and fourth orientations when the protector has been screwed into a final position. This solution makes it possible to store unscrewing energy in the sealing means. However, the function of protecting the coating of the connection is unsatisfactory, as the functional surfaces can still deteriorate if the protector is subjected to mechanical impacts.

An object of the invention is to improve on the above situation by protecting the coating applied to the connection during an operation of screwing the protector onto the connection or unscrewing the protector from it or from mechanical and/or thermal stresses to which protectors and tubular components are subjected.

To this end, the invention is a protector for a male end or a female end of a tubular drilling or production component for hydrocarbon wells, the male or female end being respectively provided with at least one external thread or internal thread, an annular external surface and an annular internal surface separated by said at least one thread, the protector comprising at least one thread comprising at least one first threaded portion comprising at least one thread with pitch P1 adapted to cooperate by screwing with the thread of the male end or the thread of the female end, and the protector comprises a second threaded portion comprising at least one thread with a pitch P2 different from P1, which makes it possible to generate an additional torque when screwing the protector onto the connection.

In accordance with one embodiment, the pitch P2 is such that the value of P2 satisfies the following equation:

$$P2 = P1 + A \times P1 \text{ with } A > 0$$

In accordance with one embodiment, the pitch P2 is such that the value of P2 satisfies the following equation:

$$P2 = P1 - A \times P1 \text{ with } A > 0$$

This makes it possible to distribute the screwing torque on load flanks or stabbing flanks of the threads with pitch P2 with load flanks or stabbing flanks of the connection threads, respectively.

In accordance with one embodiment, the external (4) or internal (17; 26; 25) connection thread has an interval WTC separating two threads of the external (4) or (17; 26) internal connection thread and the value of the coefficient A is such that:

$$0 < A \leq WTC/P1$$

This makes it possible to limit the contact pressure between flanks of threads with pitch P1 and flanks of connection threads.

In accordance with one embodiment, the or each thread with pitch P1 has a thread width TW1, the external (4; 25) or internal (17; 26) connection thread has an interval WTC separating two threads of the connection thread and the value of the coefficient A is strictly greater than 0 and less than a value Amax determined by the following equation:

$$A\max = (WTC - TW1)/P1$$

This makes it possible to limit further the contact pressure between flanks of threads with pitch P1 and flanks of connection threads.

In accordance with one embodiment, the value of A is greater than 0.2.

In accordance with one embodiment, A is between 0.05 and 0.8.

In accordance with one embodiment, the second threaded portion (39) comprises 1 to 3 threads with pitch P2 and the first threaded portion (38) comprises 2 to 5 threads with pitch P1, which makes it possible to limit the areas of contact between protector threads and connection threads and to limit any deterioration of these connection threads.

In accordance with one embodiment, the protector is a female end protector and the second threaded portion (39) is situated on the body of the protector on the upstream side of the first threaded portion (38), which makes it possible to obtain the effect on the tightening torque when the protector is already partially screwed onto the connection.

In accordance with one embodiment, at least one thread of the second threaded portion (39) is adapted to be in contact with at least one incomplete thread (4; 25) of the external thread (26) or the internal thread of the end of the tubular joint component when the protector has been screwed onto the end of the tubular joint component, which makes it possible to protect so-called complete connection threads.

In accordance with one embodiment, the protector comprises a principal body (20), an internal seal (32) and an external seal (33) that are adapted to make first and second seals with annular internal surfaces (5; 28) and annular external surfaces (27) of the male end (3) or the female end (2), respectively, which makes it possible to form a sealed area around functional surfaces of the connection.

In accordance with one embodiment, the internal seal (32) and/or the external seal (33) is flexible, which makes it possible to generate energy opposing unscrewing of the protector when it has been screwed onto the connection.

In accordance with one embodiment, the flexible seal is a flexible annular ring, which makes it possible to obtain an energy opposing unscrewing that is regularly distributed.

In accordance with one embodiment, the two seals are flexible and are flexible annular rings, which makes it possible to increase considerably the anti-unscrewing energy.

In accordance with one embodiment, the protector comprises a second internal or external thread and a third threaded portion comprising at least one thread with pitch P3 different from P2 and different from P1, which makes it possible to increase the anti-unscrewing energy.

A tubular drilling or production component for oil or natural gas wells is generally composed of a body and two connections at respective opposite ends of the body for connecting the tubular component to other tubular components. The component may be made from steel, stainless steel and/or aluminium.

In particular, a tube comprises a body and a connection at each end, i.e. at respective opposite ends of the body. A connection can be an end portion of the body provided with surfaces machined to form a seal with a corresponding connection of another tubular body. Alternatively, a connection may be a machined portion of a sleeve welded or screwed to a tubular component body. A further alternative is for a connection to be a sleeve welded to a tubular component body.

By "male connection" is meant the portion of a component including machined and/or ground surfaces with a view to forming a joint with a corresponding female connection. A male connection generally has one or more threads situated on an exterior lateral wall of the end of the component and a corresponding female connection has one or more corresponding threads on an interior lateral wall of the end of the component.

A component may have two male connections, one male connection and one female connection, or two female connections.

The main object of a protector is to protect the connections of a tubular drilling or production component for hydrocarbon or like wells against various types of external aggression: mechanical damage such as mechanical impacts, pollution (chemical and material), such as dust deposited on the functional surfaces and corrosion of the materials between the time at which the tubular component leaves the production line and the time at which it is used (possibly with the protection device mounted and demounted several times).

A protector in accordance with the invention allows rapid and reliable mounting and demounting of the protector on and from a tubular component connection on site and enables easy inspection of the state of the threads before use or between two successive uses of the component. The protector in accordance with the invention avoids the use of additional products when mounting it.

The protector in accordance with the invention makes it possible to protect the surface state or the coating of functional surfaces of a tubular component connection during mounting/demounting on site or in the factory by limiting the mechanical stresses exerted by elements of the protector on surfaces of the connection, for example by the protector thread on the connection thread of the component.

Other features and advantages of the invention will become apparent on examining the following detailed description and the appended drawings, in which.

The appended drawings may not only serve for full disclosure of the invention but also contribute to its definition, where necessary. They are not limiting on the scope of the invention.

Figure 1:
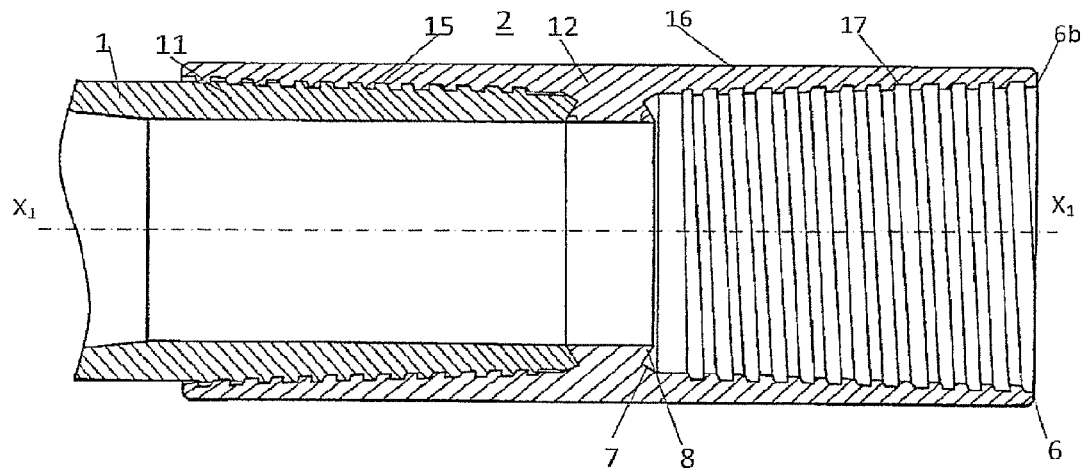
FIG. 1 is a diagrammatic sectional view of a tubular component end with a sleeve.

The female end (2) in FIG. 1 comprises a tubular body (1) comprising a threaded portion (11) and a sleeve (12) comprising a first interior thread (15) intended to be screwed onto the threaded portion (11) of the body of the tube, a female connection (16) comprising a second interior thread (17) intended to be screwed onto the male connection of another tubular component. The FIG. 1 connection is of the threaded and coupled (T&C) type with a sleeve mounted on the tube.

The interior thread (17) and a thread of a corresponding male connection may each comprise complete threads and vanishing or incomplete threads.

The female connection (16) also comprises a sealing surface (7) on the upstream side of the thread, a stop surface (8) on the upstream side of the second interior thread (17), and an end exterior annular surface (6) comprising an end stop (6b) on the downstream side of the second interior thread (17).

A protector in accordance with the invention may be used for a male or female tubular threaded joint connection, for example of T&C type, that may comprise the following elements separately or in combination, for example:

a conical thread with a sub-portion with complete threads between two sub-portions with vanishing threads;
a stop surface constituted by the transverse annular surface of the free terminal part of the male end;
a metal-to-metal sealing surface on the exterior/interior peripheral surface of the free terminal part.

Figure 2:
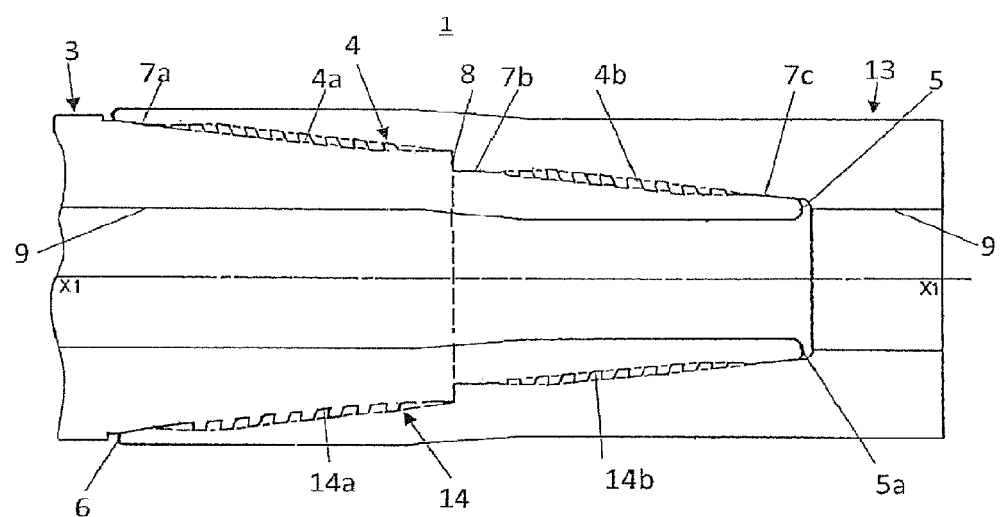
FIG. 2 is a diagrammatic sectional view of two tubular component ends assembled together.

The FIG. 2 threaded joint (1) has an axis $X_1$, a bore (9) and comprises a female connection (13) and a male connection (3). The exterior thread (4) of the male connection (3) comprises an upstream thread (4a) and a downstream thread (4b). The male connection comprises an end (5), sealing surfaces (7a, 7b, 7c) and a stop surface (8). The interior thread (14) of the female connection comprises a downstream interior thread (14a) and an upstream interior thread (14b) corresponding to the upstream exterior thread (4a) and downstream exterior thread (4b).

Two threads of the same male or female connection may be separate from each other radially and/or axially, and produced on the same cylindrical or conical surface or different conical or cylindrical surfaces. The two threads may be separated by a stop surface (8) and/or at least one sealing surface (7b) or instead simply by a cylindrical connecting surface.

When a thread is conical, it may be divided into a sub-portion with so-called complete threads, the height of which is substantially constant, and a sub-portion with so-called vanishing or incomplete threads, the height of which progressively decreases and the profile of which may feature irregularities or imperfections so as to produce a clearance between the thread crests and the thread roots. Incomplete threads absorb virtually no screwing forces in that they do not come into contact with surfaces of the threads of the conjugate part.

The threads (4a), (4b), (14a), (14b) of the connections may each comprise complete threads and vanishing or incomplete threads.

The male connection (3) of the component terminates in an end interior annular surface (5) that is substantially transversely oriented and may be a free end (5a), as shown in FIG. 2. The female connection (13) terminates in an end exterior annular surface (6) that is substantially transversely oriented.

A male connection (3) may equally comprise one or more axial stop surfaces in corresponding relationship with corresponding axial stop surfaces of a female connection (13). These stop surfaces may be situated at the free ends (5) and (6), on the upstream side of the thread and/or between two threaded portions.

A first element of a component is referred to as being on the downstream side of a second element of the component when the first element is axially positioned nearer the free end of the component. A first element of a component is referred to as being on the upstream side of a second element of the component when the first element is axially positioned farther from the free end of the component.

A male connection (3) may equally comprise one or more metal-to-metal sealing surfaces in corresponding relationship with sealing surfaces of a female connection (on the downstream side of the thread, on the upstream side of the thread or between two threaded portions).

The FIG. 2 example of a tubular joint relates to an integral tubular threaded joint which may comprise the following elements, separately or in combination:

two conical threads each with a sub-portion with complete threads between two sub-portions with vanishing threads;
a stop surface constituted by the transverse annular surface of the intermediate portion between two threads of the end;
two metal-to-metal sealing surfaces, one on the exterior/interior peripheral surface of the free terminal portion, the other on the exterior/interior peripheral surface adjacent the body of the tubular component.

Figure 3:
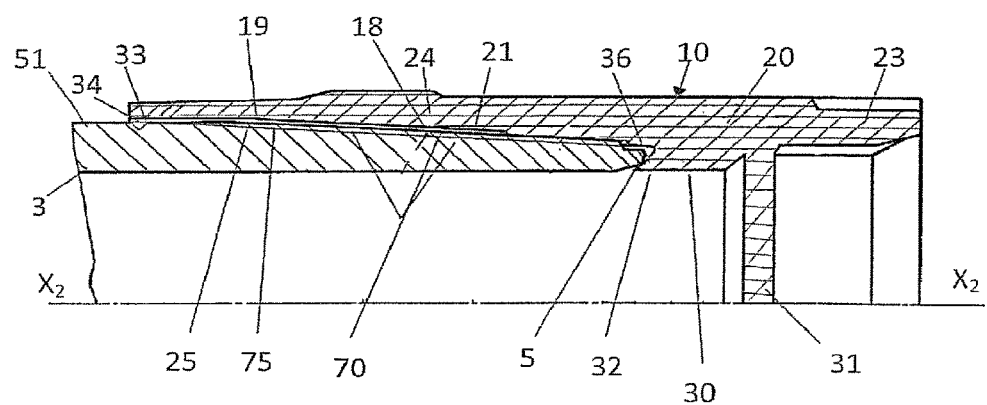
FIG. 3 is a diagrammatic part-sectional view of one embodiment of a male connection protector in accordance with the invention.

In FIG. 3 the protector (10) is of generally cylindrical shape with an axis $X_2$ that substantially coincides with the axis $X_1$ of the connection when the protector is in a final position screwed onto the connection and comprises a body (20), a shock absorber (23), an internal sealing device (32) and an external sealing device (33) cooperating with surfaces of the male connection (3) of a tubular component to create sealed barriers. The protector (10) further comprises a thread (21) adapted to be screwed onto an external thread (25) of the male connection (3).

The internal sealing device (32) comprises a rigid annular lip (36) contacting a free interior annular end surface (5) of the connection (3). The annular rigid lip is in contact with a circumference of the surface of the free end (5) of the connection so as to create a barrier to liquids, moisture and dust.

The external sealing device (33) comprises a rigid lip (34) in contact with a circumference of the exterior surface (51) of the connection so as to create a barrier to liquids, moisture and dust.

The internal sealing device (32) and the external sealing device (33) therefore form two barriers and in conjunction with the body of the protector and the connection enable the creation of an area sealed against liquids, moisture and dust. In particular, this sealed zone protects against corrosion one or more of the following elements, separately or in combination: a connection thread, a sealing or stop surface.

The body (20) has a certain stiffness while being able at least partially to absorb impacts. To this end, the body (20) may for example be made from a polymer material, by injection of a thermoplastic material into an appropriate mould. Among the various families of thermoplastic materials that may advantageously be used, there may notably be cited mixtures based on polycarbonate such as polycarbonate-polyester (PC-PBT or PC-PET) and high-density polyethylene (PE-HD) or ultra-high-density polyethylene (PE-UHD).

If the requirement is to comply with API specification 5CT, 2005 edition, which in Appendix I sets out requirements for thread protection devices, notably minimum values of resistance to axial and oblique (45° impacts for three temperatures (−46, +21 and +66° C.), there may more particularly be chosen, for example, a PE-HD produced by DOW and sold under the name DMBA-8904-NT7 or produced by BASELL and sold under the name LUPOLEN 4261 AG UV 6005, a PE-UHD produced by TICONA and sold under the name GUR 5113, or a PC-PBT produced by BAYER and sold under the name MAKROBLEND 57916.

It will be noted that the body may be partially cellular, notably in its thicker portions, in order to absorb blows better.

In FIG. 3, the sealing means are made of the same polymer material as the body of the protector and produced by moulding and directly machining the material of the body of the protector. The sealing means may alternately be screwed, glued or clipped onto the body of the protector. The sealing means may alternately be produced in a material more flexible than the material of the protector, for example an elastomer.

The body (20) also comprises a radial partition (31) forming a plug and disposed in the bore (30) of the protector body. In a variant that is not shown, the radial partition (31) includes openings or there may even be no partition. In the embodiments shown, the radial partition (31) blocks the interior space of the downstream portion (24).

Figure 4:
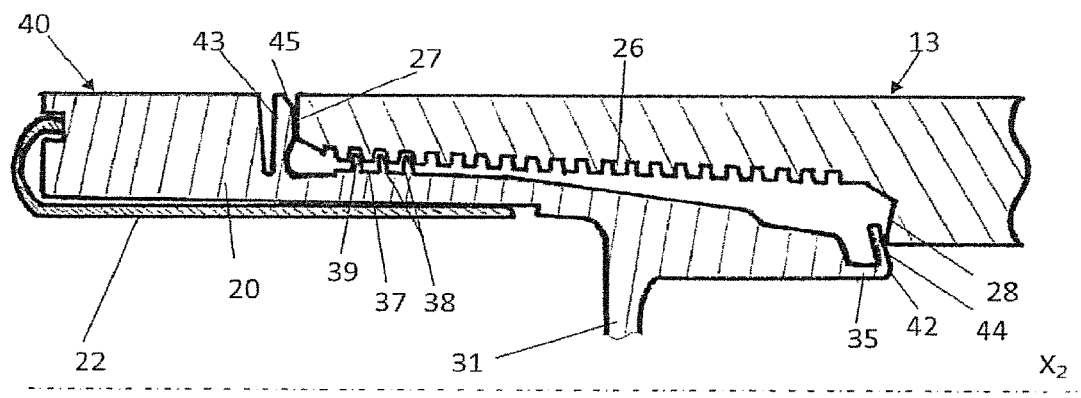
FIG. 4 is a diagrammatic part-sectional view of a female connection protector of one embodiment of the protector in accordance with the invention.

The body (20) may also be reinforced by an internal, external or integral reinforcement. FIG. 4 shows one example of a reinforcement, in the form of a metal skirt (22) for increasing the stiffness or improving the impact resistance of the protector.

The protector (10) further comprises a protector thread (21) adapted to be screwed onto a tubular component connection thread.

Figure 5:
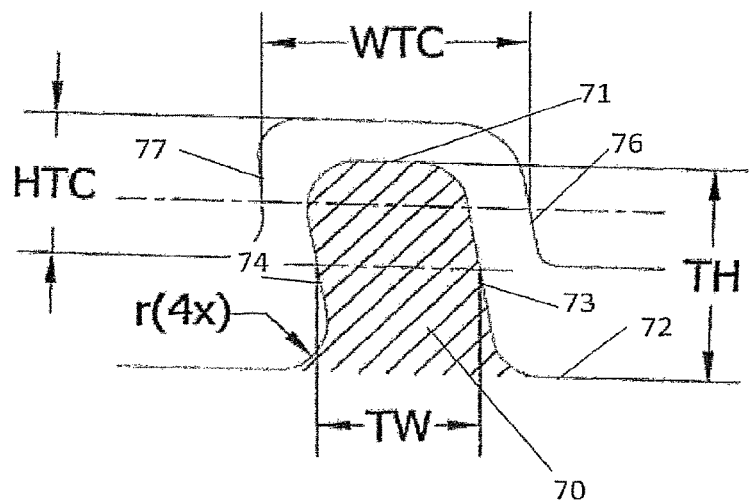
FIG. 5 is a diagrammatic profile view of a trapezoidal profile of a female connection protector thread and a female tubular connection thread.

A protector thread (21) comprises a succession of threads (70) of the type shown in FIG. 5. Each thread extends at most over one turn and the succession of threads forms the protector thread. A thread has a basic section that comprises, as shown in FIG. 5 in longitudinal section through the axis ($X_2$) of revolution of the protector, a thread crest (71), a thread root (72), a load flank (74) and a stabbing flank (73), and has a thread width (TW), a thread height (TH) and the stabbing flank pitch. The pitch of a thread is the distance separating a basic shape of the thread and its nearest repetition encountered on translation along a generatrix of a cylinder with axis ($X_2$). Said cylinder is a cone when referring to a conical thread.

In particular, there may be defined for a thread a mean thread pitch corresponding to the distance between two repetitions along a generatrix of a mid-point of the thread that is situated at half the thread width TW/2. There may equally be defined a load flank pitch and a stabbing flank pitch of the thread. A load or stabbing flank pitch corresponds to the distance between the repetition of a point at a given thread height with the next point at the same thread height. A stabbing flank pitch may be different from a load flank pitch. If the basic section of the thread does not vary in width and the pitch is constant, then the pitch of the stabbing flank corresponds to the pitch of the load flank, which corresponds to the mean thread pitch.

In the case of a non-continuous thread or a single thread, it is possible to determine the thread pitch by measuring the advance of said thread over a part-turn and then determining what the advance of the thread would be over a complete turn, which is equivalent to the thread pitch. For example, if the thread advances by 0.2 mm over a quarter-turn, then the advance of the thread over one turn is 0.8 mm; the thread pitch is therefore 0.8 mm.

A protector thread has a thread width (TW) less than the width of the interval (WTC) separating two connection threads to enable screwing of said thread onto the connection. Moreover, the protector thread width is most often given as a percentage of the connection thread width. The value of this percentage is often between 50% and 90%. The thread width is measured at the half-height of the thread.

In particular, a thread with pitch P1 has a width TW1.

The thread (21) of the protector comprises a first threaded portion (18) comprising a plurality of threads (70) with a first pitch P1 and a second threaded portion (19) comprising at least one thread (75) with a second pitch P2 different from P1.

The second threaded portion (19) is situated on the downstream side of the first threaded portion.

The pitch P1 substantially corresponds to the thread pitch of the tubular connection, which enables the protector to be screwed onto said tubular connection without difficulty. The pitch P2 therefore does not correspond to the thread of the tubular connection.

This pitch difference between the pitch P1 and the pitch P2 enables locking when screwing the protector onto the connection. In fact, when screwing the protector onto a male connection (3), in a first step, the stabbing flanks of the protector thread (21) with pitch P1 are in contact with the stabbing flanks of the male connection thread. In a second step, the second threaded portion (19) with at least one thread with pitch P2 comes into contact with the internal thread (21, 26) of the male connection. The screwing torque is then increased by an amount greater than that resulting from merely adding an additional thread flank area rubbing on the connection thread, because the threads are stressed, deformed, which increases the force to which a protector thread flank is subjected, which is exerted on it by a connection thread flank, which therefore increases the torque needed for screwing the protector onto the connection.

A protector in accordance with the invention therefore prevents certain impacts to which a protector is subjected during handling propagating as far as the protector threads and degrading the coating of the connection. The connection coatings are better protected.

In a variant, the pitch P2 is greater than the pitch P1. The load flanks of the threads of the second threaded portion (19) come into contact with load flanks of the thread of the tubular connection, and an additional contact pressure is created and exerted by the tubular connection thread on the protector thread. This pressure is caused on the one hand by the additional contact area created between the threads but above all by the stress exerted by the connection thread via the protector thread. This results in a sudden increase in the torque needed for screwing on the protector when the thread or threads with pitch P2 engage the tubular connection thread, and this also results in better retention of the protector in position, the torque needed for unscrewing it being increased in the same manner.

In one embodiment, the value of P2 is such that P2=P1+(A×P1). A is a pitch variation coefficient. The product of the pitch variation coefficient A by the pitch P1 represents the pitch offset. A is a non-zero real number.

In a variant, the coefficient A is strictly greater than 0 and less than a value such that the pitch offset is less than the distance WTC separating two connection threads; the coefficient A is such that:

$$0 < A < WTC/P1$$

In another variant, the coefficient A is strictly greater than 0 and less than a value such that the pitch offset is less than the difference between the distance WTC separating two connection threads and the width TW1 of the thread with pitch P1, which difference is divided by the pitch P1, so that:

$$0 < A < (WTC-TW1)/P1$$

When a protector in accordance with the invention has been screwed onto the connection, the flanks of the threads with pitch P1 may have a very low or zero contact pressure on the flanks of the connection threads. This definition is particularly appropriate when the pitch P2 is obtained by variation of the width of the thread with pitch P2 relative to the width of a thread with pitch P1, which then has a width TW2 different from the width TW1 of a thread with pitch P1.

In one embodiment the coefficient A is a value between 0.1 and 0.8. This range corresponds to values enabling the required effect to be achieved with most current connection dimensions.

The value of A is preferably greater than 0.2 whatever the maximum value of A chosen. This increases the resistance to accidental unscrewing.

This reduces the number of threads required to apply a torque for screwing the protector onto the connection that is sufficient to reduce the risks of unwanted unscrewing. The area of the protector threads in contact with the connection thread surfaces when the protector has been screwed on is then also reduced. The grease or coating applied to the surfaces of the threads is then subject to less deterioration in the event of an impact.

The protection provided by the protector in accordance with the invention when mounted on the connection is also less sensitive to temperature variations. In fact, a drilling and production component for oil wells is likely to be stored in sunny regions with high temperatures or in regions with polar temperatures. The protector and the connection are then subject to different dimensional variations, which can bring sub-elements of the protectors and connections into contact with one another so that they move relative to one another, for example protector thread portions move relative to connection thread portions. A protector in accordance with the invention protects the connection threads if subjected to extreme temperatures.

In an alternative embodiment, the protector thread (21) comprises a first threaded portion (18) comprising a plurality of threads with a pitch P1 of thread width TW1 and a second threaded portion (19) comprising at least one thread with a pitch P2 less than P1 such that P2=P1−(A×P1), the coefficient A being strictly greater than 0 and less than (WTC−

TW1)/P1. Alternatively, A is strictly greater than 0 and less than WTC/P1. A further alternative is for A to be between 0.05 and 0.8.

The stabbing flank with pitch P2 is offset toward the surface of a connection thread stabbing flank relative to a stabbing flank of a thread with pitch P1. The contact pressure of the threads with pitch P1 on the connection threads is reduced whereas the contact pressure between the stabbing flanks (73) of the threads with pitch P2 and the stabbing flanks (76) of the tubular connection thread is increased for a substantially identical result in terms of increasing the screwing/unscrewing torque. The contact pressure between the connection thread and the stabbing flanks of the threads with pitch P1 is reduced so that the coating applied to the surface in contact with the stabbing flanks of the threads with pitch P1 is less likely to be subject to deterioration.

The threads with pitch P2 are preferably in contact with so-called incomplete connection threads.

A protector in accordance with the invention for female connections is represented in FIG. 4 in the screwed on state. The female connection (13) comprises an annular internal surface (28), an annular external surface (27) and an internal thread (26). The female connection protector (40) comprises a body (20), an external thread (37), an internal flexible seal (42) and an external flexible seal (43).

The female connection protector (40) is shown in FIG. 4 with an optional metal reinforcement (22) intended to increase the stiffness and the impact resistance of the protector (40) and an optional radial partition (31) forming a plug.

The internal seal (42) and the external seal (43) are annular and flexible. By flexible is meant that the seals are deformable by flexing axially in order to acquire through surface contact with the internal annular surface (28) and the external annular surface (27) of the connection an energy partially opposing accidental unscrewing and maintaining a contact pressure between the seal and the annular surface of the connection so as to make and maintain a seal.

As shown in FIG. 4, the internal seal (42) is a radially outward projection in the form of a ring (or tongue or blade), intended to be in contact with an internal annular surface (28) of the female connection (13), in order to provide a continuous local seal over the whole of its circumference when the protector has been screwed into its final position. The ring (42) is preferably integral with the body (20) of the protector. The ring (42) is connected to the body of the protector by a portion (45) of smaller section adapted to make the connection to the body of the protector. The ring and its portion connected to the body of the protector have an L-shaped or V-shaped section if the connecting portion is short. The ring has a face (44) the orientation of which is chosen to minimize the area of contact with the internal annular surface (28), on the one hand to produce a contact pressure greater than would be obtained if the contact area between the face (44) and the internal annular surface (28) were greater and on the other hand to minimize deterioration of any coating or surface treatment applied to the internal annular surface (28).

The external seal (43) is a radially outward projection in the form of a ring (or tongue or blade), intended to be in contact with an external annular surface (27) of the female connection (13) in order to provide a continuous local seal over the whole of its circumference when the protector has been screwed into its final position. The ring (43) is preferably integral with the body (20) of the protector. The ring (43) has a height measured in the radial direction and a thickness measured in the axial direction, as measured as mid-height in the axial direction, such that the ratio of the height to the thickness is greater than 1, preferably greater than 3. The ring may therefore have a first inclination in the free state and a second inclination when axially flexed after the protector has been screwed into its final position. The ring (43) preferably has a rounded face (45) that on the one hand makes it possible to minimize the area of contact between the ring (43) and the external annular surface (27) to the benefit of the contact pressure and minimize the risk of deterioration of the surface treatment or coating applied to the external annular surface (27) and on the other hand to ensure rolling without slipping, i.e. rubbing, of the ring on the external annular surface, also in order to avoid deterioration of the surface treatment or coating. This geometry greatly reduces the risk of loss of contact if the quality of the surface is degraded and the dimensional tolerances of the connection are large.

The external thread (37) comprises a first threaded portion (38) comprising two threads with pitch P1 and a second threaded portion (39) comprising at least one thread with pitch P2 different from P1.

The value of P2 is such that P2=P1+(A×P1), the coefficient A being strictly greater than 0 and less than a value such that the pitch offset is less than the difference between the distance WTC separating two connection threads and the width TW1 of a thread with pitch P1, i.e. such that:

$$0<A<(WTC-TW1)/P1$$

Alternatively, the coefficient A is between 0.1 and 0.8. The value of the coefficient A depends on the size of the connection and the characteristics of the connection thread and the protector thread.

The first threaded portion (38) may comprise from 1 to 5 threads with pitch P1.

Screwing the protector (40) onto the female connection (13) then comprises the following steps:

In a first engagement step, the stabbing flanks of the threads with pitch P1 are pressed onto the stabbing flanks of the connection thread.

In a contact step, the ring (42) is brought into contact with the internal annular surface (28) and then deformed (flexed).

In a deformation step, the load flanks (74) of the threads with pitch P1 come into contact with the load flanks (77) of the connection thread. In fact, the deformation of the ring (42) pushes the body of the protector toward the downstream side of the connection and the movement of the protector is then limited by the protector threads meshing with the connection threads. The internal annular surface (28) continues to be deformed by flexing during screwing on of the protector.

In a second engagement step, at least one thread with pitch P2 meshes with the connection thread and comes into contact with the internal thread (26) of the female connection. Because of the pitch offset of the thread with pitch P2, the contact pressure of the load flanks (74) of the threads of the first threaded portion (38) decreases.

In a contact pressure reduction step, which is optional and preferred in this embodiment of the protector, the contact pressure of the load flanks of the threads of the first threaded portion (38) decreases to zero and they are no longer in contact with the load flanks (77) of threads of the female connection. With an appropriately chosen value of A, the stabbing flanks of threads of the first threaded portion (38) can be out of contact with the stabbing flanks of the connection thread.

In a locking step, the external ring comes into contact with the external annular surface (27) of the connection. Threads with pitch P2 of the second threaded portion (39) are deformed.

During the locking step, load flanks of threads of the first threaded portion (38) can come into contact with load flanks of the connection thread, but with a contact pressure lower than that exerted by the surfaces of the flanks of threads of the second threaded portion (39) on the connection thread surfaces.

The threads with pitch P2 of the first threaded portion (38) are preferably in contact with the surfaces of the incomplete threads of the thread (26) of the connection (2) when the protector (40) has been screwed onto the connection (2).

Accordingly, in this embodiment, for which the protector is provided with flexible sealing means, the protector is subjected to a first force in a first axial direction on the body of the protector, oriented toward the downstream side of the connection, because of the force exerted by the annular surfaces on the flexible sealing means of the protector, and the protector is subjected to a force in a second axial direction opposite the force in the first axial direction, exerted by at least one connection thread load flank on at least the load flank of the thread with pitch P2, which makes it possible to store energy opposing any screwing/unscrewing movement caused by vibration during transport. The threads with pitch P1 are held in position with a contact force reduced by the contact force of the thread with pitch P2, or even a zero contact force with the connection threads. The risk of deterioration of the coating applied to a thread caused by the threads with pitch P1 is greatly reduced.

A protector in accordance with the invention therefore better resists accidental partial or total unscrewing when it is subjected to vibration during transportation or handling of tubes on which protectors are mounted. The protection of the connection of the tube is more reliable.

Figure 6:
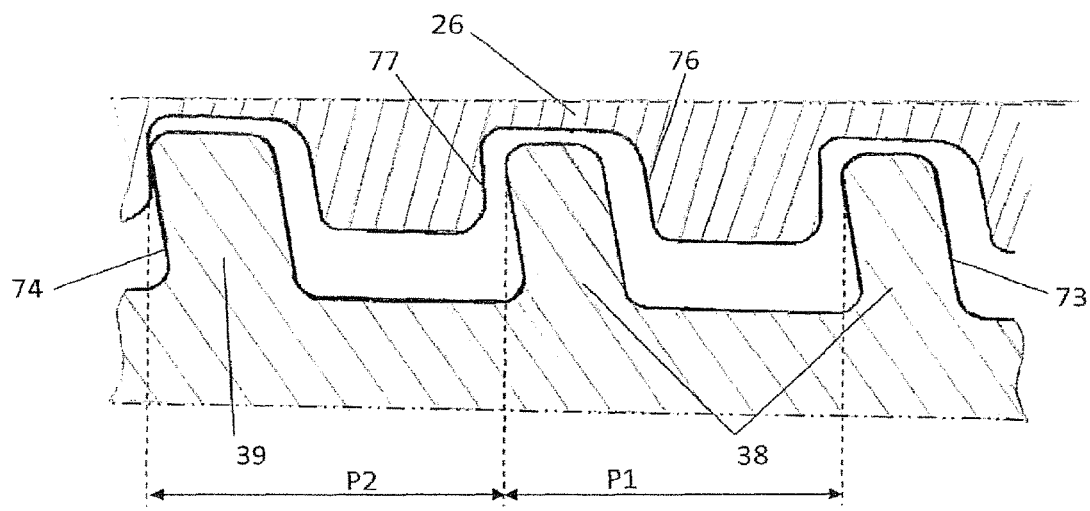
FIG. 6 is a sectional view of a detail from FIG. 4 showing thread portions of a protector in accordance with one embodiment of the invention and of a connection.

FIG. 6 shows a step of contact pressure reduction at the level of the protector thread (40) when screwing the protector (40) onto the female connection (13). The first and second threaded portions (38) and (39) are not represented with thread crests in contact with connection thread roots, but there may be contact at this location, depending on the temperature to which the protector and connection are exposed.

Each thread of the first and second threaded portions (38) or (39) has a stabbing flank (73) and a load flank (74). Each thread of the thread (26) of the female connection also has a stabbing flank (76) and a load flank (77). In the step of reducing contact pressure during screwing, the load flank of the thread with pitch P2 is in contact with a load flank of the connection thread and the pitch P2 is such that the load flanks of the threads with pitch P1 are no longer in contact with the load flanks of the connection. In fact, the pitch offset between the thread with pitch P1 and the thread with pitch P2 is less than the difference between the distance WTC separating two protector threads and the width TW1 of the threads with pitch P1, i.e. A is strictly greater than 0 and less than Amax so that $$A\max=(WTC-TW1)/P1$$

The stabbing flanks of the threads are not in contact with the connection thread stabbing flanks either. The surface coatings or treatments of the connection thread are protected at the level of the thread flanks during storage, handling and transportation.

The at least one thread with pitch P2 is preferably positioned so as to cooperate with incomplete connection threads when the protector is screwed onto the connection. These threads are less loaded during use of the connection in oil wells, and the consequences of deterioration of their coating or surface treatment is less than for complete threads.

The protector may have more than one thread with pitch P2, which makes it possible to increase the total force exerted on all of the threads with pitch P2 or to reduce the contact pressure at the level of these threads with pitch P2. The protector may comprise 1.5 threads with pitch P2. The protector may also comprise two to four threads with pitch P2, for example.

In one embodiment of the invention, a thread (21) or (37) comprises five threads with a pitch P1 and two threads with a pitch P2. The advantage of this solution is better distribution of the stresses applied to the coatings of a connection thread (4) or (26).

In accordance with one embodiment of a protector in accordance with the invention suitable for a male or female connection comprising two threads of the type shown in FIG. 2, i.e. a male or female connection comprising two threads (4a, 4b) instead of a single thread (25; 26), the protector may comprise a thread (21) or two threads intended to cooperate with the connection threads (4a) and (4b), respectively. The first threaded portion comprising at least one thread with pitch P1 and the second threaded portion comprising at least one thread with pitch P2 may be included in each upstream and downstream protector thread or in the upstream and/or downstream protector thread.

For example, each of the upstream or downstream threads may comprise two or three threads with pitch P1 and one thread with pitch P2. Or either the upstream thread or the downstream thread may comprise a thread with pitch P1 and a thread with pitch P2. The advantage of this aspect of the invention is to limit the thread portion (4) that could have its coating damaged by the protector threads.

In a variant, the upstream thread and the downstream thread comprise a first threaded portion with one or more threads with pitch P1, one of the upstream or downstream threads comprising a second threaded portion with at least one thread with pitch P2 such that P2=P1+A×P1 and the other one comprising a third threaded portion with at least one thread with a pitch P3 such that P3=P1−B×P1. A and B are two coefficients strictly greater than 0. A and B are less than 0.8. A and B are preferably less than the value of Amax.

In this embodiment, at the end of screwing the protector onto the end of the component, load flank(s) (74) of threads with pitch P2 advantageously come into contact with thread load flanks whereas stabbing flanks of threads with pitch P3 come into contact with thread stabbing flanks. When the threads with pitch P2 and the threads with pitch P3 come into engagement with the threads (4b) and (4a), respectively, the stresses imposed simultaneously by these threads increase the torque that it is necessary to apply to the protector to screw it onto the connection, or to unscrew it, thereby securing it in position. The positions of the threads with pitch P2 and the threads with pitch P3 are chosen according to whether the requirement is to increase the contact pressure on the threads with pitch P1 or on the contrary to reduce the contact pressure on said threads with pitch P1, as explained above for embodiments linked to FIGS. 3 and 4.

The pitch offset of the thread with pitch P2 may be present at the level of a stabbing flank or a load flank. It may be obtained by virtue of the mean pitch of the thread and/or by varying its width TW. Varying only the thread pitch whilst retaining a constant section of all the threads is a solution that is less costly to implement, because of the simpler machining, than the solution involving varying the thread section.

The dimensions of the protector and the relative positions of the thread(s) with pitch P2 of the sealing rings are chosen as a function of the geometry and dimensions of the connection. In practice these positions and dimensions may be calculated from the dimensions of the connection and relative to reference surfaces of the connection depending on the geometry of said connection, in accordance with calculation practices known to the person skilled in the art.

The invention claimed is:

1. A protector for a male end or a female end of a tubular drilling or production component for hydrocarbon wells when the component is being handled or transported, the male or female end respectively including at least one external thread or internal thread, an annular external surface, and an annular internal surface separated by the at least one thread, the protector comprising:
   at least one thread comprising at least one first threaded portion comprising at least one thread with pitch P1 configured to cooperate by screwing with the thread of the male end or the thread of the female end,
   wherein the protector comprises a second threaded portion comprising at least one thread with a pitch P2 different from P1; and
   wherein the pitch P2 is such that P2 satisfies one of the following two equations: P2=P1+A×P1 with A>0; P2=P1−A×P1 with A>0.

2. A protector according to claim 1, wherein the external thread or the internal thread of the connection has an interval WTC separating two threads of the external thread or the internal thread of the connection and the coefficient A is such that:

$$0 < A \leq WTC/P1/$$

3. A protector according to claim 1, wherein the or each thread with pitch P1 has a thread width TW1, the external thread or the internal thread of the connection has an interval WTC separating two threads of the connection thread and the value of the coefficient A is strictly greater than 0 and less than a value Amax determined by the following equation:

$$A\max = (WTC - TW1)/P1.$$

4. A protector according to claim 1, wherein A is greater than 0.2.

5. A protector according to claim 1, wherein A is between 0.05 and 0.8.

6. A protector according to claim 1, wherein the second threaded portion comprises 1 to 3 threads with pitch P2, and the first threaded portion comprises 2 to 5 threads with pitch P1.

7. A protector according to claim 1, wherein the protector is a female end protector and the second threaded portion is situated on a body of the protector on an upstream side of the first threaded portion.

8. A protector according to claim 1, wherein at least one thread of the second threaded portion is configured to be in contact with at least one incomplete thread of the external thread or the internal thread of the end of the tubular joint component when the protector has been screwed onto the end of the tubular joint component.

9. A protector according to claim 1, further comprising a principal body, and an internal seal and an external seal that are configured to make first and second seals with annular internal surfaces and annular external surfaces of the male end or the female end, respectively.

10. A protector according to claim 9, wherein the internal seal and/or the external seal is flexible.

11. A protector according to claim 10, wherein the flexible seal includes a flexible annular ring.

12. A protector according to claim 11, wherein the internal and external seals are flexible and include flexible annular rings.

13. A protector according to claim 1, further comprising a second internal or external thread and a third threaded portion comprising at least one thread with pitch P3 different from P2 and different from P1.

* * * * *